W. F. FOLMER.
APPARATUS FOR READING REVERSED IMAGES.
APPLICATION FILED OCT. 30, 1913.
1,089,917. Patented Mar. 10, 1914.
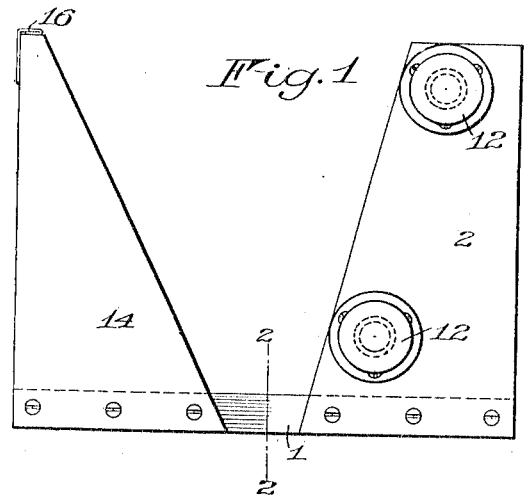
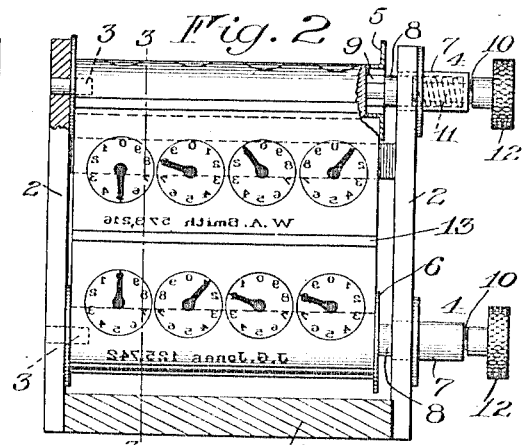
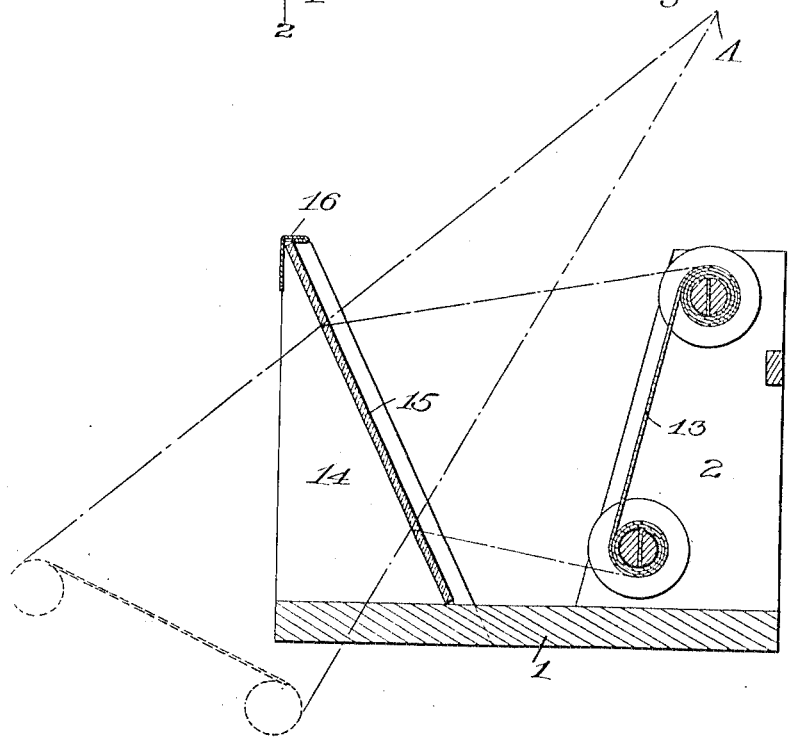
Inventor
William F. Folmer

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

APPARATUS FOR READING REVERSED IMAGES.

1,089,917. Specification of Letters Patent. Patented Mar. 10, 1914.

Application filed October 30, 1913. Serial No. 798,228.

*To all whom it may concern:*

Be it known that I, WILLIAM F. FOLMER, of Rochester, in the county of Monroe and State of New York, have invented certain new and useful Improvements in Apparatus for Reading Reversed Images; and I do hereby declare the following to be a full, clear, and exact description of the same, reference being had to the accompanying drawings, forming a part of this specification, and to the reference-numerals marked thereon.

My present invention relates to optical apparatus and it has for its object to provide a device for reinstating reversed images such as those recorded by a camera on a sensitized surface, so that an obverse or corrected image may be presented to the eye.

The improvements are further directed toward providing a device of this nature particularly adapted for supporting and so displaying in succession a series of separate exposures on a continuous photographic film strip.

To these and other ends the invention consists in certain improvements and combinations of parts all as will be hereinafter more fully described, the novel features being pointed out in the claims at the end of the specification.

In the drawings: Figure 1 is a side elevation of a reading device constructed in accordance with and illustrating one embodiment of my invention; Fig. 2 is a central section taken substantially on the line 2—2 of Fig. 1 and looking in the direction of the image support; and Fig. 3 is a longitudinal central section taken substantially on the line 3—3 of Fig. 2.

Similar reference numerals throughout the several figures indicate the same parts.

The present device was designed more particularly in connection with the meter reading camera forming the subject matter of my co-pending applications, Serial No. 798,226, filed October 30th, 1913, and Serial No. 798,227, filed October 30th, 1913, to facilitate the reading of the photographic images recorded thereby, it being necessary to correct these images, which are reversed, in order to quickly read the letters and figures that they contain. In this view, the device comprises a base 1 having two supporting standards 2 rising therefrom at each side and preferably located at one end of the base. At top and bottom these standards are provided at one side with trunnions 3 and at the other with supports 4 forming journals for rotatably mounting two film spools 5 and 6. The support 4 is in the nature of a winding key similar to the film winding key of a camera and may be withdrawn from the vicinity of its engagement with the spool for the purpose of inserting and removing the latter. To these ends, the said support comprises sleeves 7 in each of which turns a spindle 8 having a flat portion 9 at its inner end adapted to engage the slot in the end of the film spool and an intermediate reduced portion 10 which is surrounded by a spring 11, the ends of which act against the enlarged portion of the spindle and the closed end of the sleeve 7, respectively, to normally hold the spindle in engagement with the spool. It may be disengaged by pulling out on the turning knob 12. The spool centers are so disposed that a film strip 13 wound from one spool onto the other has a portion of its length stretched flat between them, as shown. At the other end of the base 1 there are provided two somewhat similar supports 14 that are grooved or otherwise fitted to constitute a frame for a mirror 15 that is thus disposed in fixed relation to the base and to the stretch of film on the image support, the mirror being held within the grooves by means of a cap-piece 16, or otherwise. These relative angles are such that the mirror 15 projects a correction of the image on the other support in a direction in rear of the latter and toward a view point above or in rear of it, as indicated at A in Fig. 3.

To view or transcribe the complete readings of a whole strip of film exposed in a camera of the type illustrated in my other application mentioned, or otherwise, it is only necessary to insert the film on its original roll, or upon the transfer roll that may carry it after development, in one of the bearing supports 3—5 and by turning the knob 12 of the other bearing support, unroll it upon a transfer spool located on said last named support. The entire strip is thus revealed a little at a time and becomes visible in the mirror and, by preference, the extent of separation of the spools is such as to expose an entire picture area at one time, substantially as shown.

I claim as my invention:

1. In a device for reading reversed photographic images, the combination with a support for holding the image at a fixed angle, of a mirror facing said support and arranged at a relatively fixed angle to the support to reflect the image thereon toward a view point in rear of the support.

2. In a device for reading reversed photographic images, the combination with a base, an image support rising from the base and adapted to hold the image at a fixed angle, a mirror support rising from the base opposite the image support and containing a mirror arranged at a relatively fixed angle to the image support to reflect an image thereon to a view point in rear of the image support.

3. In a device for reading reversed photographic images, the combination with a base, supporting members rising from the base and spaced photographic film roll supports journaled in the supporting members and comprising turning knobs permitting an exposed photographic strip to be stretched between the rolls at a fixed angle and to be reeled from one to the other, of mirror supporting members rising from the base opposite the image support and containing a mirror arranged at a relatively fixed angle to the stretch of the photographic strip to reflect the image thereof to a view point in rear of the image support.

WILLIAM F. FOLMER.

Witnesses:
RUSSELL B. GRIFFITH,
NELSON H. COPP.